United States Patent [19]

Credali et al.

[11] Patent Number: 5,382,626
[45] Date of Patent: Jan. 17, 1995

[54] CROSS-LINKABLE POLYESTER/ISOCYANATE COMPOSITIONS SUITED FOR THE PREPARATION OF COMPOSITE MATERIALS

[75] Inventors: Lino Credali, Bologna; Paolo Cioni, Novara, both of Italy; Kurt C. Frisch, Grosse Ile, Mich.; Jiri E. Kresta, Warren, Mich.; Fushu Fu, Detroit, Mich.

[73] Assignee: Montedison s.p.A., Italy

[21] Appl. No.: 666,311

[22] Filed: Mar. 8, 1991

[30] Foreign Application Priority Data

Mar. 9, 1990 [IT] Italy ................................ 41002 A/90

[51] Int. Cl.$^6$ ................... C08F 8/30; C08L 75/00; C08L 75/04
[52] U.S. Cl. ................................ 525/126; 525/131; 525/440; 525/455; 525/903; 156/60; 156/166
[58] Field of Search ............... 525/126, 131, 455, 440, 525/903; 156/60, 166

[56] References Cited

U.S. PATENT DOCUMENTS

| | | | |
|---|---|---|---|
| 3,700,752 | 10/1972 | Hutchinson | 525/454 |
| 3,876,726 | 4/1975 | Ford, Jr. et al. | 525/28 |
| 3,886,229 | 5/1975 | Hutchinson et al. | 525/28 |
| 4,062,203 | 12/1977 | Leonard et al. | 464/38 |
| 4,062,826 | 12/1977 | Hutchinson et al. | 523/512 |
| 4,077,931 | 3/1978 | Leitheiser et al. | 521/138 |
| 4,125,487 | 11/1978 | Olstowski | 525/126 |
| 4,182,830 | 1/1980 | Ford, Jr. | 528/75 |
| 4,213,837 | 7/1980 | Bristowe et al. | 522/90 |
| 4,232,133 | 11/1980 | Ferrarini, Jr. et al. | 525/452 |
| 4,241,199 | 12/1980 | Dunleavy | 525/440 |
| 4,287,116 | 9/1981 | Burns | 525/455 |
| 4,296,215 | 10/1981 | Markiewitz | 525/440 |
| 4,352,906 | 10/1982 | Reed et al. | 525/126 |
| 4,386,166 | 5/1983 | Peterson et al. | 521/99 |
| 4,581,384 | 4/1986 | Marion | 521/110 |
| 4,781,947 | 11/1988 | Saito et al. | 525/455 |

FOREIGN PATENT DOCUMENTS

| | | |
|---|---|---|
| 1164142 | 3/1984 | Canada . |
| 048117 | 3/1982 | European Pat. Off. . |
| 8145714 | 8/1983 | Japan . |
| 8187435 | 11/1983 | Japan . |
| 440386 | 6/1975 | U.S.S.R. . |

*Primary Examiner*—John Kight, III
*Assistant Examiner*—Rabon Sergent
*Attorney, Agent, or Firm*—Morgan & Finnegan

[57] ABSTRACT

This invention relates to crosslinkable polymeric compositions and a process for preparing them which show a low content of vinyl monomers, are suitable for the fabrication of composite materials, have good mechanical properties, and comprise: a liquid polyisocyanate; a polyol having a maximum functionality of 7 and an average molecular weight of from about 200 to about 10,000; an unsaturated polyester or a vinylester resin; a radical polymerization initiator stable at temperatures below 70° C.; a decomposition promoter for the initiator; a trimerization catalyst for the isocyanate; and optionally, a mineral filler having dehydrating properties.

23 Claims, No Drawings

CROSS-LINKABLE POLYESTER/ISOCYANATE COMPOSITIONS SUITED FOR THE PREPARATION OF COMPOSITE MATERIALS

FIELD OF THE INVENTION

The present invention concerns new cross-linkable polymeric compositions suitable for the production of composite materials, preferably by means of "lay-up" processes.

More particularly, this invention relates to compositions consisting of two reactive systems capable of independently polymerizing, resulting in an interpenetrating polymer network (IPN).

In said compositions, one of the two reactive systems consists of an unsaturated polyester or vinylester, capable to react, in the presence of free radical generating initiators, with vinyl monomers, resulting in three-dimensional polymeric structures.

The second system consists of at least one polyisocyanate and of at least one polyol which, in the presence of suitable catalysts, will result in the formation of carbamates and isocyanurates thereby creating a second three-dimensional structure forming part of the IPN. Occasionally, especially when one operates with unsaturated polyester resins, there may be formed some graft, between the two structures.

BACKGROUND OF THE INVENTION

Interpenetrating polymers derived from unsaturated polyesters and isocyanates have already been prepared and described in the Prior Art.

U.S. Pat. No. 4,386,166 describes foams based on modified polyesters obtained from mixing together two reactive components containing foaming agents, one of which consists of a mixture of an unsaturated polyester with a low molecular weight polyol and with catalysts for the formation of urethanes and isocyanurates, while the other component consists of a mixture of a polyisocyanate with a peroxide and a urethane catalyst.

The components of such reactive systems combined with each other, are not susceptible to yield cross-linked (interpenetrated) products possessing adequate characteristics of impact strength nor to be used in the manufacture of products by means of the "lay-up" process.

In U.S. Pat. No. 4,581,384 are described rigid foams with improved dimensional stability, obtained by the combination of two reactive systems, one of which consists of a polyol and a hydroxyl-terminated unsaturated polyester, while the system consists of a polyisocyanate and a vinyl-monomer capable of cross-linking with the polyester, the stoichiometric ratio NCO/OH in the whole of the two systems being at the most 1.5/1.

Also in this case, the whole of the components of the two reactive systems turns out to be unsuitable for the preparation of manufactured articles with characteristics of high rigidity together with high impact strength, nor for use in the "lay-up" type process.

Thus, the object of the present invention is that of providing cross-linkable polymeric compositions suitable for the manufacture of composite materials and characterized by inherently improved impact strength with respect to the unsaturated polyesters. Moreover, these compositions are characterized by a lesser shrinkage during the cross-linking processes, a lower content in vinyl monomers, in particular styrene, and in other volatile monomer, and, at last, by better self-estinguishing properties though maintaining the other properties of the unsaturated polyesters.

Such compositions, which form one of the objects of the present invention, consist of the following components in admixture with each other, at the indicated by-weight ratios:

A) at least one isocyanate liquid when in admixture with the other components, having a functionality of at least 2 and not greater than 5, but preferably comprised between 2 and 4, and a viscosity at 25° C. comprised between 20 and 10000 cPs, but preferably between 40 and 1000 cPs;

B) at least one polyol with a functionality of at least 2 and not greater than 7, but preferably comprised between 2 and 5, having a molecular weight of at least 200 and less than 10,000, but preferably comprised between 300 and 5000, in such a quantity as to ensure a molar ratio (NCO/OH) between the isocyanate groups of component (A) and the hydroxyl groups be comprised between 2 and 8 but preferably between 3 and 7;

C) at least one vinylester or polyester resin, containing ethylenic unsaturations of the vinyl or vinylidenic type, in a 30–80% by weight admixture in a vinyl or divinyl monomer, as defined further below, in such a quantity that (C) represents from 20 to 80% of the sum of weights of (A)+(B)+(C);

D) at least one initiator of radical polymerization by itself stable at temperatures below 70° C., and in quantities comprised between 0.1% and 4% by weight on the sum of weights of (A)+(B)+(C);

E) at least one decomposition promoter of initiator (D) at temperatures below 70° C., consisting of a salt soluble in the mixture of (A), (B) and (C), of a transition metal, preferably Co (II) and Mn(II), in a quantity comprised between 0.001 and 0.5% and preferably between 0.001 and 0.05% by weight, calculated on the metal, on the weight of the sum of (A)+(B)+(C), or consisting of an aromatic amine N,N-dialkylsubstituted in a quantity comprised between 0.05 and 1% by weight;

F) at least one trimerization catalyst for isocyanate (A) in quantities comprised between 0.01 and 1% by weight on the sum of weights of (A), (B) and (C);

G) from 0 to 20%, but preferably from 4 to 10%, by weight on the sum of (A), (B) and (C) of a mineral charge exerting a dehydrating action, such as for instance $CaCO_3$, zeolite powder or paste, molecular sieves and the like.

The isocyanates of point (A) are those comprised in one of the following classes:

(I) Isocyanates of general formula:

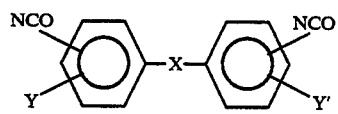

wherein:

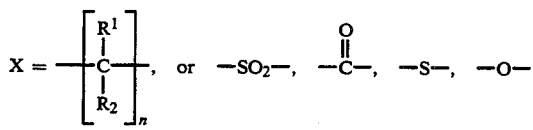

$R_1$, $R_2$, either equal to or different from each other, may be H or alkyl containing from 1 to 5 carbon atoms;

n=a number comprised between 0 and 4;

Y and Y', either equal to or different from each other, may be H or —CH$_3$ or, F, Cl, Br.

(II) Isocyanates of general formula:

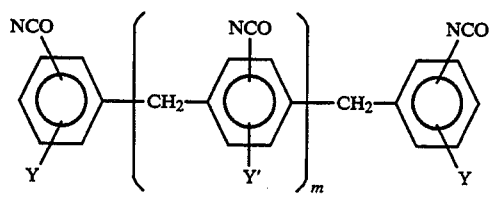

wherein:
Y=H, Cl, Br, F or —CH$_3$,
m=0, 1, 2 or 3.

Typical isocyanates in this class, with Y=H, are produced by MOBAY Chem. Corp. under the trade name of Mondur MR.

(III) Isocyanates of the general formula:

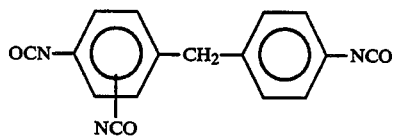

(IV) Isocyanates of the general formula:

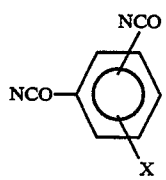

wherein:
X=H, F, Cl, Br or —CH$_3$,
and the two —NCO groups are not in position 1,2 with respect to each other, as well as the following isocyanates:
2,6-tolylenediisocyanate
2,4-tolylenediisocyanate
1,4-naphthalenediisocyanate
1,5-naphthalenediisocyanate
1,6-naphthalenediisocyanate
2,6-naphthalenediisocyanate
tris(isocyanatopnenyl)methane
cyclohexanediisocyanate
methylene-bis-(4-cyclohexyldiisocyanate)
and blends thereof
MDI (methylenediphenyldiisocyanate) modified with carbodiimide; an isocyanate of this type is known as Isonate 143L, produced by Dow Chemical Corp.;
the quasi-prepolymers obtained by condensation of the isocyanates mentioned so far with the polyols as have been previously defined under paragraph (B).

The isocyanates of class (II) are the preferred ones.

As polyols usable for the compositions according to this invention, there may be cited, just for exemplifying purposes, those obtained by reaction of the following compounds:

a) diphenols of the general formula:

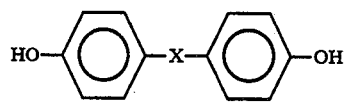

wherein:

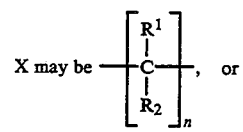

$R_1$, $R_1$, equal to or different from each other, may be —H, —CH$_3$ or —C$_2$H$_5$, n=a number comprised between 1 and 4, extremes included.

B) bisphenol A,

C) novolacs, with alkylenoxides such as for instance ethyleneoxide and propyleneoxide, 1,2-buteneoxide, epichlorohydrin, etc., and moreover the derivatives of the condensation of such oxides with low molecular weight polyols, both aliphatic such as ethyleneglycol, propyleneglycol, 1,4-butanediol, glycerol, trimethylol propane, pentaerythritol, diethanolthioether, cyclohexanediol and the likes, as well as aromatic such as hydroquinone, resorcinol, etc.

Examples of such polyols are: poly(oxyethylene)-glycol, poly(oxypropylene)glycol,bisphenol-A oxypropylate.

Moreover, amongst such polyols are comprised the saturated polyesterpolyols obtainable by reaction of carboxylic acids such as terephthalic, isophthalic, succinic and adipic acids as well as mixtures thereof with glycols such as: ethyleneglycol, propyleneglycol, bisphenol-A dihydroxyethylether, tetramethyleneglycol or with higher homologues.

A typical polyester polyol usable for the objects of the present invention are products known under the trade name of MULTRATHANE produced by Mobay.

Last, but not least, polyols usable for compositions according to this invention are those based on hydroxy-terminated polycaprolactones, typical examples of which are TONE polyols produced by Union Carbide or CAPA polyols produced by La Porte, and hydroxy-terminated polycarbonates preferentially containing 1,6-hexanediol or 1,4-cyclohexanedimethanol in the polymer chain, examples of which are the commercial products known under the trade name DURACARB produced by PPG Industries.

The polyols deriving from the condensation with alkylene oxides, in particular poly(oxypropylene)-glycols, the polyester polyols and the polyetherester-polyols are amongst the preferred polyols.

For the compositions of this invention it is preferable that the component (B) shall consist of a mixture of a diol with a polyol with a functionality greater than 2; however, and in particular for compositions suited to be used in processes differing from the "Lay-up" process, the diol may be absent, provided that the NCO/OH ratio herein above defined, is preferably within the range of from 4 to 7.

As vinylester resins, constituting component (C), are usable all common vinylester resins in commerce, inclusive of mixtures of neat polymer in a vinyl or divinyl monomer, and having such a viscosity as to confer to the mixture of A+B+C a viscosity comprised between 100 and 400 cPs at 20° C.

More particularly, the polymeric fraction of such vinylester resin may show the following structure:

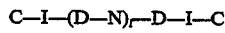

wherein:
C=a group derived from a hydroxylterminating ester of the acrylic, methacrylic acid or similar acids;
I=a group derived from a polyisocyanate of the type described previously, and preferably from methylenediphenyldiisocyanate;
D=a group derived from an organic diol of the precedently described type, and preferably from bisphenol A or from similar compounds;
N=a group deriving from a saturated or unsaturated dicarboxylic acid or from one of its anhydrides:
t=a number comprised between 1 and 5.

Resins of the above described type and usable for the purpose of the present invention, as well as methods for their preparation, are described in U.S. Pat. Nos. 3,876,726, 4,213,837, 4,182,830 and in European Patent Application No. 48,117.

Other vinylester resins usable for the purpose of the present invention may be those described by the following general structure:

wherein:
D and t have the same meaning and values described in the previous formula for vinylester resins;
A=a group derived from acrylic or methacrylic acid or similar acrylic compounds;
M=a group derived from an alkylene oxide such as, for example, ethylene oxide, propylene oxide or epichlorohydrin.

The vinyl and divinyl monomers present in such vinyl ester resins consist of vinyl esters such as: vinyl acetate and the alkyl acrylates and methacrylates (with the alkyl containing from 1 to 20, but preferably from 1 to 10 carbon atoms), such as: methyl acrylate, ethylacrylate, n- and isopropylacrylate, n-, iso- and tert.-butylacrylate, as well as the aryl-, alkaryl-, aralkyl-, cycloalkyl acrylates and the corresponding methacrylates.

Such vinyl monomers may, moreover, consist of aromatic vinyl compounds such as styrene and its alkyl derivatives such as d-methylstyrene and vinyltoluene as well as the vinyl nitriles such as acrylonitrile and its derivatives such as methacrylonitrile.

Divinyl monomers comprise, for instance, alkylen glycoldimethacrylate, divinylbenzene and diallylphthalate.

The unsaturated polyester resins that constitute the component (C) comprise the polyester mixtures with vinyl or divinyl monomers, in which the polymeric fraction (polyester) derives from the esterification of dicarboxylic acids or of their anhydrides with glycols of various nature, and in which at least one fraction of the dicarboxylic acid or of the glycol, or of both, contains unsaturation of the ethylenic type (olefinic).

Examples of such products include resins formed by esterification of maleic, fumaric, itaconic acids or their mixtures, possibly in combination with saturated aromatic or aliphatic dicarboxylic acids, such as phthalic acids and their anhydrides, with ethylene-, propylene-, diethylene-, dipropylene-, glycol and possibly with 1,4-butanediol.

Preferably there are used polyesters derived from the condensation of maleic and/or fumaric and/or isophthalic acids with ethylene glycol or mixtures of glycols.

The vinyl or divinyl monomers present in the unsaturated polyesters which form component (C), are substantially the same which have previously been described for the vinylester resins.

As radical polymerization initiators (component (D)) are mentioned, for exemplifying purposes, the organic peroxides such as the alkyl esters of peroxycarboxylic acids in which the alkyl contains from 1 to 20 carbon atoms, but preferably contains from 1 to 5 carbon atoms, and preferably is: tert-butyl, n-butyl and tert-amyl; cumenehydroperoxide, ethylbenzenehydroperoxide, dicumylperoxide, di-tert-butylperoxide, hydrogen peroxide and, moreover, the azo-compounds such as for instance azo-bis(isobutyronitrile) and 2,2'-azobis(2,4-dimethylvaleronitrile).

Initiators preferred for the purpose are: perbenzoate and peracetate of tert-butyl or tert-amyl and dibutyldiperoxyphthalate.

These initiators are selected for exemplifying purposes and are not intended for limitation.

As initiator decomposition promoters (component(E)) are cited the organic salts of transition metals such as: Mn(II) and Co(II) and the copper salts soluble in resins (C); more particularly acetylacetonates, carboxylates and the alkanoates of said metals and specifically their naphthenates, octanoates, hexanoates and decanoates. Such salts are preferably used in the form of a solution in plasticizers or in fluids which are reactive with at least one of the above described components (A) and (C), such as for instance a glycol, an unsaturated fatty acid or its ester, and the likes.

As decomposition promoters may moreover be cited the aromatic tertiary amines commonly used for this purpose in radical polymerization processes, amongst which there may, for example, be cited the dialkylanilines such as diethylaniline and N-(3-ethylcyclohex-2-enyl)aniline.

Preferred decomposition promoters in the process of this invention are the cobalt salts, as examples of which may be cited the octanoates and neodecanoates, as well as diethylaniline.

As trimerization catalysts component (F)) there may be cited aliphatic tertiary amines and, preferably, aliphatic tertiary polyamines such as: N,N,N',N'',N'''-pentamethyldiethylenetriamine, N-(2-hydroxyethyl)N,N',N'-trimethylethylenediamine, tetramethylethylenediamine; the aminoalkyltriazines, such as 2,4,6-tris(dimethylaminopropyl) triazine; the carboxylates of quaternary ammonium salts such as, for example, N,N,N-trimethyl-N-(2-hydroxy)propylammonium 2- ethylhexanoate, the carboxylates of metals of groups I and II and of transition metals such as potassium octanoate, potassium 2-ethylhexanoate, lead acetate and lead stearate; the catalysts prepared "in situ" from tertiary amines and epoxy or aziridine derivatives (epoxy resins, phenylglycidylether), and, moreover, aminoalkylphenols such as 2,4,6-tris(dimethylaminomethyl)-phenol, 2,6-bis(dimethylaminomethyl)phenol and, 1,3-diazobicyclo(4,5,0)undec-2,3-ene and 1,3-diazobicyclo(3,4,0)non-2-ene and combinations of the above.

Particularly suited for the purpose are the trimerization catalysts containing N,N'-dialkyl derivatives of glycine salts of alkali metals such as, for example sodium N-(2-hydroxy-5-nonylphenyl) methyl-N-methylglycinate whose preparation is described in U.S. Pat. No. 3,896,052. either as such or in admixture with the previously mentioned trimerization catalysts.

The compositions according to this invention show pot life times suitable for application in several processes based on thermosetting resins and can provide, preferably for "lay-up" process, pot lives greater than 30 min. at 25° C.; in addition they are capable to harden essentially completely at room temperature.

Said compositions allow one to obtain thermosetting resins possessing improved impact strength and exhibiting a lower shrinkage rate with respect to the unsaturated vinylester and polyester resins of the Prior Art, without prejudice for the other mechanical properties possessed by said resins, besides higher self-estinguishing properties.

Moreover, said compositions offer the advantage of a low content in styrene and in other volatile products with respect to that of the unsaturated polyesters and vinylesters.

They are suited for the preparation of manufactured articles through methods of the RTM (Resin Transfer Molding) type, and especially for the manufacture of composite materials by means of "lay-up" methods.

For such applications are perticularly suited the compositions having a viscosity at 20° C. comprised between 400 and 3000 cP. Said viscosity values may by attained means of a suitable selection or choice of the type of isocyanate, of polyol and/or of the quantity of vinyl monomer present in the (C) component, according to selection criteria by persons skilled in the Art.

The composition object of the present invention may be used for preparing composite materials by the traditional processes known in the Art such as "lay-up", pultrusion, filament winding, RTM etc., using for this purpose organic or inorganic fibers such as polyamide, aramide, carbon, silicon carbide, glass etc., in the form of continuous fibers or of staples, of fabrics, mats, layers or randomly arranged.

In general, the compositions according to the present invention allow to obtain thermosetting resins having an impact strength (measured without indent) greater than 100 J/m, a bending module of at least 20000 kg/cm$^2$, deformation at break under bending greater than 2% and a shrinkage rate during cross-linking below 8%, but preferably below 4%.

The HDT values of the resins in general are greater than 80° C., but preferably greater than 100° C.

For the resinous component (C) of the compositions the preferred ones are the vinylester resins.

Some of the preferred compositions according to this invention are those in which the polyol (component (B)) is represented by a polypropyleneglycol and/or by a polyesterpolyol of a molecular weight comprised between 300 and 4000, possessing a functionality comprised between 2 and 4, extremes included, and in which the molar ratio NCO/OH is comprised between 3 and 7.

Further compositions, amongst the preferred ones, are those of the above cited type and in which the isocyanate is represented by a polymeric MDI or by a modified MDI carbodiimide, and shows a functionality between 2 and 3.

The compositions of the present invention may be prepared by a simple and simultaneous admixture of all the components from (A) to (G), as illustrated above.

However, in order to avoid premature cross-linking reactions of the composition, it is advisable to maintain such components suitably separated from each other and to mix them together just at the moment at which it is intended to effect within a short time the cross-linking of the composition and the preparation of the manufactured article. Preferably to above mentioned components are grouped into two batches, the first of which consists of components (B), (C), (E) and (F), while the second consists of components (A) and (D).

The mineral charge or filler (G), if and when used, may be admixed either in the first batch or the second one.

The cross-linking of the composition may be carried out within a temperature range of between 10° and 150° C.

The preferred conditions depend, at any rate, on the type of application.

More particularly, for the preparation of composites with the "lay-up" method, one preferably should carry out the cross-linking at temperatures comprised between about 10° and 60° C., while in the "resin transfer molding (RTM) the temperature may even attain 150° C., with a lower limit of 10° C. Operating under such preferred conditions implies a particular selection of the catalytic cross-linking system.

Preferred catalytic systems are, for instance, those consisting of the following combinations of the compounds, the quantities of which are herein expressed in percent by weight on the whole of the composition.

1.a) 0.5–3% b.w. of a peroxy-compound represented by:
   tert-butylperbenzoate,
   tert-amylperbenzoate,
   tert-butylperoxyacetate;
   di-n-butyl-diperoxyphtalate, or a combination of said peroxy-compounds in a total quantity of 0.5–3% by weight;
b) 0.01–0.15% b.w. of 2-ethylhexanoate of cobalt (II)
c) 0.005–0.05% b.w. of 2-hydroxypropyltrimethylammonium 2-ethylhexanoate;
d) 0.1–0.8% of 2,4,6-tris(dimethylaminomethyl)-phenol.

2.a) 0 5–3% b.w. of a peroxy compound as in the above point 1;
b) 0.02–0.2% b.w. of cobalt neodecanoate;
c) 0.05–0.4% b.w. of the product of the above point 1.c);
d) 0.1–0.8% b.w. of the product of the above point 1.d).

3.a) from 0.5 to 3% b.w. of at least one peroxy compound as specified herein above under point 1.a);
b) 0.01–0.2% b.w. of a decomposition promotor consisting of a cobalt salt as defined under the precedent points 1.b) and 2.b);
c) 0.05–0.4% b.w. of the product of the preceding point 1.c);

d) 0.1–0.8% b.w. of the product of the herein preceding point 1.d);
e) 0.1–1% b.w. of a 50% solution in diethyleneglycol of sodium N-(2-hydroxy-5-nonylphenylmethyl-N-methyl-glycinate (trimerization catalyst A).
4.a) from 0.5 to 3% by weight of a peroxy-compound like the one of point 3.a) herein above;
b) from 0.01–0.2% b.w. of decomposition promoter as under point 3.b;
c) from 0.1 to 0.8% b.w. of the product of point 1.d);
d) from 0.1 to 1% b.w. of a mixture of the trimerization catalyst A, as defined under point 3.e), with potassium acetate and ethoxylated cocoamine (trimerization catalyst B).

The components of the above illustrated catalytic systems may be used either as such or, if it is required to facilitate the dispersion in the resin, in the form of a solution in reactive solvents such as, for instance, diols, or in not reactive media such as plasticizers.

EXAMPLES

The following examples are only presented for illustrating the present invention without limiting in any way the scope of the invention.

In all the cited examples, the products obtained after cross-linking of the compositions therein described, have been characterized by the following measurements conducted according to the methods shown below.

MEF modulus of elasticity under bending according to ASTM D 790;
CRF breaking load under under bending according to ASTM D 790;
DRF deformation at break under bending according to ASTM D 790;
CRT Breaking load under tension according to ASTM D 636;
El.Break Elongation at break under tension according to ASTM D 636;
IRN impact resistance notched according to ASTM D 256;
IRU impact resistance unnotched according to ASTM D 256.

In the following is given the chemical composition of the products that are mentioned in the examples with their respective commercial names.

| | |
|---|---|
| ATLAC 580-05$^R$ | vinylester resin; produced by Reichold Resins Co. |
| Co-octoate$^R$ | 2-ethylhexanoate in a 10–15% solution in a plasticizer; produced by Mooney Co. |
| Co-polycure-A+$^R$ | a CO(II) salt in a plasticizer; produced by Mooney Co. |
| DABCO TMR$^R$ | 2-hydroxypropyltrimethylammonium 2-ethylhexanoate in a 50% b.w. solution of dipropyleneglycol; produced by Air Products Co. |
| Co-Hydroxy Ten-Cem$^R$ | basic neodecanoate of CO(II) in a 21% b.w. solution in hydroxylated plasticizer; produced by Mooney Co. |
| Mondur MR$^R$ | Polymeric MDI of functionality = 2.7 and isocyanate equivalent = 133, produced by Mobay Chem. Corp. |
| Pluracol TP-440$^R$ | trifunctional polypropylenglycol based on trimethylolpropane of molecular weight = 425, produced by BASF Chem. Co. |
| Pluracol 2010$^R$ | dihydroxy-terminated polypropylenegly-col of 2000 molecular weight; produced by BASF Chem. Corp. |
| Baylith-L$^R$ | 50% by weight zeolite powder dispersed in castor oil; produced by Mobay Chem. |
| Isonate 143$^R$ | Co. carbodiimide-modified MDI, with a functionality of 2.1–2.2 and an isocyanate equivalent weight 143; produced by Dow Chem. Co. |
| DABCO TMR-30$^R$ | 2,4,6-tris(N,N-diinethylaminomethyl)-phenol; produced by Air Products Co. |

In the examples from 1 to 19, reported in the following hereunder, there are described polymerizable compositions with a high impact resistance, all of them characterized by their capacity to crosslink at room temperature and by gel times greater than 60 minutes at the same temperature.

These compositions, containing polyisocyanates, thus turn out to be particularly useful when used in the manufacture of composites with glass fibers by means of "lay-up" methods.

EXAMPLE 1

Into a cylindrical container of 250 ml holding capacity, made of polypropylene and fitted with a lid, were introduced in rapid succession: 50 grams of Atlac 580-05 ® vinylester resin, already diluted in a 47% b.w. styrene, having a specific weight=1.05, an acidity number=4 and a viscosity at 25° C.=400 cPs; together with 13.9 g of Pluracol 2010 ®, 6.0 g of Pluracol TP-440 ®, 0.25 g of DABCO-TMR ® (trimerization catalyst for isocyanate), 0.25 g of DABCO-TMR-30 ® (trimerization co-catalyst), 2.5 g of tert-butyl perbenzoate, 0.25 g of Co-Hydroxy Ten-Cem ® and 30.1 g of polymeric MDI (Mondur MR ®).

Said components were rapidly mixed together and the resulting mixture was then degassed under vacuum (1 mmHg) for 3 minutes so as to remove the air bubbles in suspension.

60 g of the mixture were then rapidly poured into a teflon lined mold (15×15 cm) 2 mm thick, being careful to ensure that the exposure to the air of the liquid surface be the shortest possible in order to avoid secondary reactions with the humidity of the air; the remaining 40 g were used for the determination of the gel point.

The composition was then allowed to cross-link in the mold for at lest 10 hours at room temperature (18°–25° C.). The laminates extracted from the molds were then allowed to stand for 15–20 days without any particular protection, thus completing the hardening. The products thus obtained were used for measuring the mechanical properties and the ensuing results are reported in Table 1, together with those of examples 2 and 3.

EXAMPLES 2 AND 3

Two compositions were prepared and characterized in the same way as that described in example 1, but with the components and the quantities reported in Table 1 (columns 2 and 3) together with the respective gel times and the mechanical properties of each composition after cross-linking.

EXAMPLES 4, 5 AND 6

Three formulations were prepared and characterized in the same way as that described in Examples 1–3, but with the components and quantities reported in Table 2, together with the respective gel times and the mechanical properties of each composition after hardening.

In Examples 4–6 there was used a combination of three isocyanate trimerization catalysts, in which combination the presence of trimerization catalyst A unexpectedly allowed to attain gel times for the hybrid resin longer than those obtained only with DABCO-TMR and DABCO-TMR-30 catalysts used in the same quantity reported Table 2 and, at the same time, there was observed a greater completeness in the cross-linking process of the samples.

EXAMPLES FROM 7 TO 12

In this case six compositions were prepared and characterized in an analogous way to the one described in example 1, but with the components and quantities described in Table 3, together with the respective gel times and the mechanical properties of each composition after hardening.

Compositions 7–12 are characterized by varying ratios between the vinyl ester (VE) resin and the urethaneisocyanurate (PUI=sum of the weights of polyols and polyisocyanate), while in all the compositions the isocyanate/hydroxyl ratio was kept constant.

The results of the characterization clearly showed that the mechanical propetries of the compositions after the cross-linking assumed a maximum value for the VE/PUI ratios comprised between 2.3 and 1.0 and that in any case the impact strength was consistently increased with respect to the value that characterizes a composition based on pure vinylester resin, as reported in comparative Example A.

COMPARATIVE EXAMPLE A

A composition was prepared and characterized in an analogous way as that described in example 1, but containing 100 g of Atlac 580-05 ® vinylester resin, 2.5 g of tert-butylperbenzoate and 1 gram of Co-Hydroxy Ten-Cem ®. No polyol nor any polyisocyanate were used in this composition. The mixture turned out to have a gel time of 120 minutes, a MEF of 29360 kg/cm$^2$, a CRF of 1065 kg/cm$^2$, a CRT of 444 kg/cm$^2$, a deformation at break under bending of 3.3% and an impact strength (without indent) of 68 J/m.

Comparing this example with the preceding ones, there will be noted a strong increase of the impact strength for all the hybrid compositions containing isocyanurate without any substantial loss in any of the other properties.

EXAMPLE 13

A formulation was prepared in an analogous way to that described in Example 1, but consisting of 50 grains of Atlac 580-05 ® vinylester, already diluted in a 47% b.w. styrene, having a specific weight=1.05, an acid number=4, a viscosity at 25° C. equal to 400 cPs; 9.44 g of Pluracol 2010 ®, 4.06 g of Pluracol TP-440 ®, 0.024 g of an isocyanate trimerization catalyst (DABCO-TMR ®), 0.23 g of a trimerization co-catalyst consisting of DABCO TMR-30 ®, 2.5 g of tert-butylperbenzoate, 0.25 g of Co-octoate ®, 4 grams of a paste consisting of finely powdered zeolite dispersed in castor oil (Baylith-L ® produced by Mobay Co.) and 26.5 g of polymeric MDI (Mondur-MR ® produced by Mobay Co.)

60 grams of the composition were then poured into a mold analogous to the one described in example 1, and the remainder was used for measuring the gel time.

This mixture was then allowed to harden for at least 10 hours in the mold and was then allowed to stand for a period of from 15 to 20 days at room temperature.

The laminates thus obtained were then used for measuring the mechanical properties, the results of which are shown in Table 4 together with the data relating to the examples from 14 to 19.

Although during and throughout the process described in this example, inclusive of the mixing phase of the components, no prevention of the contact of the resin with the humidity of the air was effected, no formation of surface films or bubbles was observed in the laminate.

EXAMPLES 14–19

Six compositions were prepared and characterized according to the same procedure followed in example 13, but using the components and quantities described, together with the results of the characterization, in Table 4 in the columns corresponding to the numbers from 14 to 19.

The presence of zeolite powder in the formulations described in examples 13–19, has prevented the formation of films and bubbles on the surface when a film (about 1 mm thick) of each composition was left in the air until having attained the gel point.

Similar compositions, but without zeolite powder, showed, on the contrary, the formation of surface films and bubbles when treated under the same conditions.

EXAMPLES 20–22

Three compositions were prepared and characterized in the same way as that described in examples 1–3, but with the components and the quantities reported in Table 5, together with the respective gel times and the mechanical properties of each compositions after cross-linking.

In examples 20–22, no diol of molecular weight $\geq 800$ was used as instead described in examples from 1 to 19. In examples 20 and 21, where a low NCO/OH ratio was used, there were obtained compositions suitable for the manufacturing of composites by processes other than lay-up because of relatively short gel times. On the contrary, the composition described in example 22 is characterized by a much higher NCO/OH ratio and shows a gel time long enough to allow its use in lay-up processes.

In all three cases, the mechanical properties of each product after cross-linking are better than those shown by a pure vinylester resin, in agreement with the aim of the present invention.

EXAMPLE 23

Into a cylindrical container of 250 ml holding capacity, made of polypropylene and fitted with a lid, were introduced in fast succession 50 grams of Atlac 580-05 ® vinylester resin, already diluted in a 47% by weight styrene, having a specific weight equal to 1.05, Acid Number=4, viscosity at 25° C.=400 Cps; together with 7.6 g of Pluracol 2010 ®; 5.1 g of a triol consisting of Pluracol TP-440 ®; 0.2 g of DABCO-TMR ® (isocyanate trimerization catalyst); 1.8 g of DABCO TMR-30 ® (a trimerization co-catalyst); 2.5 g of tert-butylperbenzoate; 1 g of Co-octoate and 37.3 g of carbodiimide modified MDI (ISONATE 143-L ®).

The components were rapidly mixed together and the mixture was then degassed under vacuum (1 mmHg) for 3 minutes, so as to eliminate any air bubble.

One part of the mixture was then poured into a mold like the one described in example 1, and made to cross-link by heating at 60° C. for at least 5 hours.

The remaining part in the reaction container was used for measuring the gel time at 20° C., which in this case amounted to 15 minutes. The laminate obtained from the mold was then cut to obtain the test pieces for the mechanical characterization. The results have been recorded in Table 6.

EXAMPLES 24–27

The examples from 24 to 27 relate to the preparation and characterization of further 4 formulations made by the method described in example 23. All four formulations contained the same catalysts in the same proportions described in example 23, while the other components were introduced according to the quantities shown in Table 6. In this same table there are also shown the results of the characterization of the product obtained from each example.

The examples from 23 to 27 concern formulations characterized by gel times comprised between 10 and 20 minutes at 25° C., formulations which, though being of minor interest for uses in lay-up processes, allow to obtain products of increased impact strength when compared with the properties of the sample of pure vinylester and whose preparation is reported, for comparative purposes, in "Comparative example B".

COMPARATIVE EXAMPLE "B"

Into a cylindrical container as the one described in example 23, were introduced: 100 g of Atlac 580-05 vinylester resin, 2.5 g of ter-butyl perbenzoate, 1 g of Co-octoate® and 0.3 g of diethylaniline. This mixture was then made to cross-link and the products were characterized as described in example 23. The results of the mechanical tests are shown in the last column of Table 6.

TABLE 1

| | EXAMPLES | | |
|---|---|---|---|
| | 1 | 2 | 3 |
| COMPOSITION (GRAMS) | | | |
| ATLAC 580-05 | 50 | 50 | 50 |
| PLURACOL 2010 | 13.9 | 12.1 | 9.1 |
| PLURACOL TP440 | 6.0 | 5.2 | 6.1 |
| MONDUR-MR | 30.1 | 32.7 | 34.8 |
| DABCO-TMR | 0.25 | 0.25 | 0.25 |
| DABCO-TMR-30 | 0.25 | 0.25 | 0.25 |
| CoHydroxy-TEN-CEM | 0.25 | 0.25 | 0.25 |
| tert-butylperbenzoate | 2.5 | 2.5 | 2.5 |
| PROPERTIES | | | |
| NCO/OH | 4 | 5 | 5 |
| Gel Time (minutes) | 95 | 90 | 80 |
| MEF (kg/cm$^2$) | 29950 | 30800 | 33850 |
| CRF (kg/cm$^2$) | 1045 | 1110 | 1110 |
| CRT (kg/cm$^2$) | 610 | 610 | 520 |
| DRF (%) | 4.4 | 4.1 | 3.6 |
| IRU (J/m) | 234 | 171 | 184 |

TABLE 2

| | EXAMPLES | | |
|---|---|---|---|
| | 4 | 5 | 6 |
| COMPOSITION (GRAMS) | | | |
| ATLAC 580-05 | 50 | 50 | 50 |
| PLURACOL 2010 | 7.9 | 10.6 | 12.1 |
| PLURACOL TP440 | 7.9 | 7.0 | 5.2 |
| MONDUR-MR | 34.2 | 32.4 | 32.7 |
| DABCO-TMR | 0.20 | 0.20 | 0.20 |
| DABCO-TMR-30 | 0.25 | 0.25 | 0.25 |
| Trimerization catalyst A | 0.20 | 0.20 | 0.20 |
| tert-butylperbenzoate | 2.5 | 2.5 | 2.5 |
| CoPoly-A* | 0.25 | 0.25 | 0.25 |
| PROPERTIES | | | |
| NCO/OH | 4 | 4 | 5 |
| Gel Time (minutes) | 65 | 90 | 90 |
| MEF (kg/cm$^2$) | 32720 | 30150 | 26830 |
| CRF (kg/cm$^2$) | 1000 | 1010 | 1010 |
| CRT (kg/cm$^2$) | 460 | 610 | 620 |
| DRF (%) | 3.3 | 3.7 | 4.9 |
| IRU (J/m) | 140 | 194 | 224 |

NOTES:
* = Radical polymerization promoter: Cobalt Polycure-A (Produced by Mooney).

TABLE 3

| | EXAMPLES | | | | | |
|---|---|---|---|---|---|---|
| | 7 | 8 | 9 | 10 | 11 | 12 |
| COMPOSITION (GRAMS) | | | | | | |
| ATLAC 580-05 | 80 | 70 | 60 | 50 | 40 | 30 |
| PLURACOL 2010 | 4.85 | 7.27 | 9.69 | 12.12 | 14.56 | 16% |
| PLURACOL TP-440 | 2.08 | 3.12 | 4.16 | 5.2 | 6.23 | 7.27 |
| MONDUR-MR | 13.07 | 16.9 | 26.15 | 32.68 | 39.23 | 45.76 |
| DABCO-TMR-30 | 0.25 | 0.25 | 0.25 | 0.25 | 0.25 | 0.25 |
| Trimerization catalyst B | 0.25 | 0.25 | 0.25 | 0.25 | 0.25 | 0.25 |
| tert-butyl perbenzoate | 2.5 | 2.5 | 2.5 | 2.5 | 2.5 | 2.5 |
| CoHydroxy Ten-Cem | 0.5 | 0.25 | 0.25 | 0.25 | 0.25 | 0.25 |
| PROPERTIES | | | | | | |
| NCO/OH | 5 | 5 | 5 | 5 | 5 | 5 |
| Gel Time (minutes) | 130 | 105 | 95 | 88 | 80 | 60 |
| MEF (kg/cm$^2$) | 30720 | 31980 | 34010 | 31750 | 27960 | 24870 |
| CRF (kg/cm$^2$) | 1060 | 1260 | 1395 | 1285 | 1240 | 1135 |
| CRT (kg/cm$^2$) | 692 | 810 | 720 | 770 | 690 | 695 |
| DRF (%) | 4.7 | 5.0 | 5.3 | 5.0 | 6.4 | 6.7 |
| IRU (J/m) | 82 | 367 | 299 | 362 | (708) | (923) |

TABLE 4

| | EXAMPLES | | | | | | |
|---|---|---|---|---|---|---|---|
| | 13 | 14 | 15 | 16 | 17 | 18 | 19 |
| COMPOSITION (GRAMS) | | | | | | | |
| ATLAC 580-05 | 50 | 50 | 50 | 50 | 50 | 50 | 50 |
| PLURACOL 2010 | 9.44 | 13.6 | 12.1 | 4.0 | 8.0 | 8.0 | 6.0 |
| PLURACOL TP-440 | 4.1 | 5.9 | 5.2 | 5.2 | 5.0 | 3.0 | 4.0 |
| MONDUR-MR | 26.5 | 30.1 | 32.7 | 32.7 | 32.0 | 32.0 | 32.0 |
| DABCO-TMR | 0.024 | 0.024 | | | | | |
| DABCO-TMR-30 | 0.23 | 0.23 | 0.25 | 0.25 | 0.25 | 0.25 | 0.25 |
| Trimerization catalyst B | | | 0.25 | 0.25 | 0.25 | 0.25 | 0.25 |
| CoHydroxy Ten-Cem | | | 0.35 | 0.30 | 0.25 | 0.25 | 0.25 |
| tert-butyl perbenzoate | 2.5 | 2.5 | 2.0 | 1.5 | 1.5 | 1.5 | 1.5 |
| BAYLITH-L (zeolite) | 4.0 | 4.0 | 8.0 | 8.0 | 8.0 | 8.0 | 8.0 |
| PROPERTIES | | | | | | | |
| NCO/OH (polyols)* | 5 | 4 | 5 | 6 | 5.5 | 8 | 7 |
| Gel Time (minutes) | 57 | 63 | 110 | 85 | 85 | 150 | 110 |
| MEF (kg/cm$^2$) | 29360 | 24860 | 25300 | 32840 | 30870 | 32000 | 32700 |
| CRF (kg/cm$^2$) | 747 | 750 | 925 | 1035 | 1165 | 1225 | 1145 |
| CRT (kg/cm$^2$) | 539 | 407 | 590 | 665 | 725 | 610 | 710 |
| DRF (%) | 2.7 | 3.2 | 4.4 | 3.4 | 5.8 | 5.1 | 4.6 |
| IRU (J/m) | 81 | 133 | 142 | 268 | 244 | 292 | 267 |

NOTES: *The effective NCO/OH ratio should also include the OH's contained in the dryer BAYLITH-L.

TABLE 5

| | EXAMPLES | | |
|---|---|---|---|
| | 20 | 21 | 22 |
| COMPOSITION (GRAMS) | | | |
| ATLAC 580-05 | 50 | 50 | 50 |
| PLURACOL TP-440 | 12.7 | 16.9 | 5.2 |
| MONDUR-MR | 37.3 | 33.1 | 32.7 |
| DABCO-TMR | 0.024 | 0.024 | |
| DABCO-TMR-30 | 0.23 | 0.23 | 0.25 |
| Trimerization catalyst B | | | 0.25 |
| tert-butylperbenzoate | 2.5 | 2.5 | 1.5 |
| Co-octoate | 0.25 | 0.25 | |
| CoHydroxy Ten-Cem | | | 0.3 |
| BAYLITH-L (ZEOLITE) | 4.0 | 4.0 | 8.0 |
| PROPERTIES | | | |
| NCO/OH (polyols) | 3 | 2 | 6.7 |
| Gel Time (minutes) | 30 | 23 | 75 |
| MEF (kg/cm$^2$) | 32410 | 29450 | 34550 |
| CRF (kg/cm$^2$) | 915 | 961 | 1000 |
| CRT (kg/cm$^2$) | 325 | 572 | 635 |
| DRF (%) | 3.8 | 4.9 | 3.2 |
| IRU (J/m) | 126 | 258 | 122 |

TABLE 6

| | EXAMPLES | | | | | |
|---|---|---|---|---|---|---|
| | 23 | 24 | 25 | 26 | 27 | COMP. B |
| COMPOSITION (GRAMS) | | | | | | |
| PLURACOL 2010 | 7.6 | 11.6 | 8.7 | 6.4 | 5.8 | — |
| PLURACOL TP-440 | 5.1 | 4.9 | 5.8 | 6.5 | 5.7 | — |
| ATLAC 580-05 | 50 | 50 | 50 | 50 | 50 | 100 |
| ISONATE 143-L | 37.3 | 33.5 | 35.5 | 37.1 | 38.5 | — |
| PROPERTIES | | | | | | |
| MEF (kg/cm$^2$) | 30020 | 24900 | 27820 | 27300 | 31170 | 29420 |
| CRF (kg/cm$^2$) | 1020 | 920 | 920 | 890 | 760 | 1060 |
| CRT (kg/cm$^2$) | 540 | 560 | 600 | 460 | 470 | 490 |
| DRF (%) | 4.8 | 7.0 | 5.8 | 4.0 | 3.2 | 3.0 |
| IRN (J/m) | 43.0 | 70.3 | 44.0 | 33.8 | 27.4 | 10.7 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Cross-linkable polymeric composition in the form of an interpenetrating polymer network suitable for the manufacture of composite materials endowed with high mechanical properties and prepared in the absence of a foaming agent comprising, by weight:

A) at least one polyisocyanate being in a liquid form when in admixture with the other components, having a functionality of at least 2 but not greater than 5, and a viscosity at 25° C. between 20 and 10,000 cP;

B) at least one polyol having a functionality of at least 2 and not greater than 7, molecular weight of at least 200 but below 10,000, in such a quantity as to get a molar ratio (NCO/OH) of the isocyanate groups of the component (A) to the hydroxyl groups between 2 and 8;

C) at least one vinylester or polyester resin being in admixture with a vinyl or divinyl monomer, said at least one vinyl ester or polyester resin containing vinyl or vinylidene ethylenic unsaturation and representing 30–80% by weight of the admixture and 20% to 80% based on the sum of the weights of (A), (B), and (C);

D) at least one radical polymerization initiator intrinsically stable at temperatures below 70° C., in quantities between 0.1 and 4% based on the sum of the weights of (A), (B), and (C);

E) at least one decomposition promoter of the initiator (D), active at temperatures below 70° C., constituted by a salt of a transition metal, soluble in the mixture (A), (B), and (C), in such a quantity that the metal included in the transition metal salt is between 0.001% and 0.5% based on the sum of the weights of (A), (B), and (C), or an aromatic amine N,N-dialky substituted in a quantity between 0.05 and 1% based on the sum of the weights of (A), (B), and (C), or a mixture comprising said salt and said amine in the quantity above specified for each one;

F) at least one trimerization catalyst of isocyanate (A), in a quantity between 0.01 and 1% based on the sum of the weights of (A), (B), and (C); and G) from 0% to 20% by weight based on the sum of the weights of (A), (B), and (C) of a mineral charge exerting a dehydrating action, said components (A)–(G) providing a "pot-life" in excess of 30 minutes.

2. Composition according to claim 1, wherein the isocyanate (A) has a functionality between 2 and 4, and a viscosity between 40 and 1000 cP at 25° C.

3. Composition according to claim 1, wherein polyol (B) has a functionality between 2 and 5.

4. Composition according to claim 1, wherein polyol (B) has a molecular weight of between 300 and 5000.

5. Composition according to claim 1, wherein the molar ratio NCO/OH is between 3 and 7.

6. Composition according to claim 1, wherein isocyanate (A) is comprised of an isocyanate of the formula:

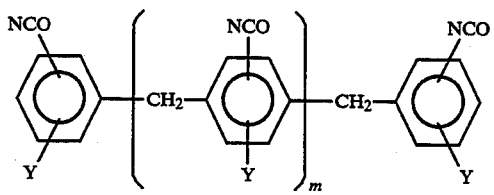

wherein:
Y=H, Cl, Br, F or —CH$_3$,
m=a number between 0 and 3, extremes included.

7. Composition according to claim 1, wherein polyol (B) consists of a mixture of a diol with a polyol having a functionality greater than 2.

8. Composition according to claim 1, wherein the radical polymerization initiator (D) is selected from the perbenzoates, the percetates of tert-butyl, tert-amyl, or dibutylperoxyphthalate.

9. Composition according to claim 1, wherein the decomposition promoter of catalyst (E) is selected from cobalt salts or N,N-diethylaniline.

10. Composition according to claim 1, wherein the trimerization catalyst (F) is selected from aliphatic or araliphatic tertiary polyamines, quaternary ammonium salts of carboxylic acids, carboxylates of groups I or II metals or transition metals of the Period Table of Elements which are soluble in the mixture of (A), (B) and (C), or substituted glycinates of Group I or II metals of the Periodic Table of Elements.

11. Composition according to claim 1, wherein the composition possesses a viscosity between 400 and 3,000 cP at 20° C.

12. Composition according to claim 1, wherein polyol (B) is a polypropylene glycol or a polyester polyol having molecular weights between 300 and 4000 and with a functionality between 2 and 4, extremes included, and in which the molar ratio NCO/OH is between 3 and 7.

13. Composition according to claim 1, wherein isocyanate (A) is represented by a polymeric MDI or by a carbodiimide modified MDI, and which has a functionality between 2 and 3.

14. Composition according to claim 1, wherein polymerization initiator (D) consists of a peroxy compound, in quantities between 0.5% and 3%, selected from tert-butylperbenzoate, tert-amylperbenzoate, tert-butylperoxy-acetate, di-n-butyl-di-peroxyphthalate, or mixtures thereof; the decomposition promoter of catalyst (E) consists of cobalt (II) 2-ethylhexanoate in quantities of between 0.01 and 0.15%; the trimerization catalyst (F) consists of 2-hydroxypropyltrimethyl ammonium 2-ethylhexanoate in quantities between 0.005% and 0.05% or of 2,4,6-tris(dimethylaminomethyl)phenol in quantities between 0.1% and 0.8%, 15. Composition according to claim 1, wherein polymerization initiator (D) consists of a peroxy compound, in quantities between 0.5% and 3%, selected from: tert-butylperbenzoate, tert-amylperbenzoate, tert-butylperoxyacetate, di-n-butyl-di-peroxyphthalate, or mixtures thereof; the decomposition promoter (E) is Cobalt(II) neodecanoate in amounts between 0.02 and 0.2%; and the trimerization catalyst (F) consists of 0.05–0.4% of 2-hydroxypropyltrimethylammonium 2-ethylhexanoate and 0.1–0.8% of 2,4,6-tris-(dimethylaminomethyl)phenol.

16. Composition according to claim 1, wherein initiator (D) is a peroxy compound, in quantities between 0.5% and 3%, selected from: tert-butylperbenzoate, tert-amylperbenzoate, tert-butyl-peroxy-acetate, di-n-butyl-diperoxyphthalate, or mixtures thereof; the decomposition promoter (E) is selected from the group consisting of Cobalt (II) 2-ethylhexanoate and Cobalt (II) neodecanoate in quantities between 0.01 and 0.2%; trimerization catalyst (F) is a mixture comprising: 0.05–0.4% of 2-hydroxypropyltrimethylammonium 2-ethylhexanoate, 0.1–0.8% of 2,4,6-tris(dimethylaminomethyl)phenol, and 0.1–1.0% of a 50% solution of N-(2-hydroxy-5-nonylphenyl)methyl-N-methylglycinate of sodium in diethyleneglycol, wherein the total quantity of the catalyst (F) components in the mixture is 0.1 to 1% based on the sum of the weight of components (A), (B) and (C).

17. Composition according to claim 1, wherein initiator (D) consists of at least one peroxy-compound, in quantities between 0.5% and 3%, selected from: tert-butylperbenzoate, tert-amylperbenzoate, tert-butylperoxyacetate, di-n-butyl-di-peroxyphthalate, or mixtures thereof; the decomposition promoter (E) is selected from the group consisting of Cobalt(II) 2-ethylhexanoate and of Cobalt(II) basic- neodecanoate in quantities between 0.01 and 0.2%; and trimerization catalyst (F) is 0.1–0.8% of 2,4,6-tris(dimethylaminomethyl)phenol or 0.1–1.0% of a mixture comprising: sodium N-(2-hydroxy-5-nonylphenyl)-methyl-N-methylglycinate; potassium acetate; ethoxylated cocoamine; and diethylenglycol.

18. Composition according to claim 1, wherein the component (G) consists of a zeolite powder or paste in a quantity between 2 and 5% zeolite by weight of the sum of (A), (B), and (C).

19. A process for preparing the compositions according to claim 1, which comprises the addition of a first mixture of components (B), (C), (E) and (F) to a second mixture of components (A) and (D), wherein component (G) is optionally part of either said first or second mixture.

20. Method for the preparation of composite materials containing organic or inorganic fibers comprising, combining the composition according to claim 1 with organic or inorganic fibers and cross-linking the resin components to form a composite.

21. The composition according to claim 1, wherein the transition metal of (E) is Co(II) or Mn(II).

22. Method for preparation of thermosetting materials comprising subjecting the composition according to claim 1 to a cross-linking reaction of the resin components.

23. Cross-linkable polymeric composition in the form of an interpenetrating polymer network suitable for the manufacture of composite materials endowed with high mechanical properties consisting of, by weight:
- A) at least one polyisocyanate being in a liquid form when in admixture with the other components, having a functionality of at least 2 but not greater than 5, and a viscosity at 25° C. between 20 and 10,000 cP;
- B) at least one polyol having a functionality of at least 2 and not greater than 7, molecular weight of at least 200 but below 10,000, in such a quantity as to get a molar ratio (NCO/OH) of the isocyanate groups of the component (A) to the hydroxyl groups between 4 and 8;
- C) at least one vinylester or polyester resin being in admixture with a vinyl or divinyl monomer, said at least one vinyl ester or polyester resin containing vinyl or vinylidene ethylenic unsaturation and representing 30–80% by weight of the admixture and 20% to 80% based on the sum of the weights of (A), (B), and (C);
- D) at least one radical polymerization initiator intrinsically stable at temperatures below 70° C., in quantities between 0.1 and 4% based on the sum of the weights of (A), (B), and (C);
- E) at least one decomposition promoter of the initiator (D), active at temperatures below 70° C., constituted by a salt of a transition metal, soluble in the mixture (A), (B), and (C), in such a quantity that the metal included in the transition metal salt is between 0.001% and 0.5% based on the sum of the weights of (A), (B), and (C), or an aromatic amine N,N-dialky substituted in a quantity between 0.05 and 1% based on the sum of the weights of (A), (B), and (C), or a mixture comprising said salt and said amine in the quantity above specified for each one;
- F) a catalyst consisting of at least one isocyanate (A) trimerization catalyst, in a quantity between 0.01 and 1% based on the sum of the weights of (A), (B), and (C); and
- G) from 0% to 20% by weight based on the sum of the weights of (A), (B), and (C) of a mineral charge exerting a dehydrating action, said components (A)–(G) providing a "pot-life" in excess of 30 minutes.

* * * * *